United States Patent [19]

Shiraki et al.

[11] 4,407,127
[45] Oct. 4, 1983

[54] FLASHING APPARATUS OF GEOTHERMAL POWER PLANTS

[75] Inventors: Yoshihiro Shiraki, Tokyo; Tokumitsu Kojima, Yokohama, both of Japan

[73] Assignee: Tokyo Shibaura Denki Kabushiki Kaisha, Kanagawa, Japan

[21] Appl. No.: 302,089

[22] Filed: Sep. 14, 1981

[30] Foreign Application Priority Data

Sep. 22, 1980 [JP] Japan ................. 55-130752

[51] Int. Cl.³ .................................. F03G 7/04
[52] U.S. Cl. ..................... 60/641.5; 60/641.2; 202/197; 203/40
[58] Field of Search ............ 60/641.2, 641.5, 649, 60/673, 670; 202/197, 173; 203/40, 88

[56] References Cited

U.S. PATENT DOCUMENTS

| | | | |
|---|---|---|---|
| 3,003,931 | 10/1961 | Worthen et al. | 202/197 X |
| 3,373,089 | 3/1968 | Vautrain et al. | 202/197 X |
| 3,492,795 | 2/1970 | Guerrieri | 202/197 X |
| 4,026,111 | 5/1977 | Matthews | 60/641.5 |
| 4,138,851 | 2/1979 | Rogers et al. | 60/641.5 |

FOREIGN PATENT DOCUMENTS 3020297 12/1981 Fed. Rep. of Germany .

OTHER PUBLICATIONS

Peerless Mfg. Co., Bulletin 14-100, "Peerless Horizontal Gas Separator".

*Primary Examiner*—Allen M. Ostrager
*Assistant Examiner*—Stephen F. Husar
*Attorney, Agent, or Firm*—Stevens, Davis, Miller & Mosher

[57] ABSTRACT

A flashing apparatus for a geothermal power plant in which underground hot water introduced into the flashing apparatus is flashed therein to generate flashed steam is divided into a flashing chamber, a water separation chamber, a drain discharge chamber, and a steam discharge chamber by several vertical and horizontal perforated partition plates and the generated steam is fed into a steam turbine through these chambers and partition plates. The flashing apparatus comprises a horizontal cylindrical container closed at both ends by end plates one of which has a hemi-spherical configuration on which the underground hot water is ejected and a drain catcher is located in the flashing chamber to catch and remove drain.

4 Claims, 6 Drawing Figures

4,407,127

FLASHING APPARATUS OF GEOTHERMAL POWER PLANTS

BACKGROUND OF THE INVENTION

This invention relates to flashing apparatus for a geothermal power plant.

A known type geothermal power plant for generating electric power by utilizing underground hot water heated by terrestrial heat is shown in FIG. 1, in which the hot water is fed from a well 1 into a separator 2 wherein the hot water and steam are separated. The steam separated in the separator 2 is then supplied into a steam turbine 3 and the hot water remaining in the separator 2 is fed into a flashing apparatus 4. The inner pressure of the flashing apparatus 4 is lower than that of the separator 2 so as to evaporate the hot water thereby to generate steam which is additionally fed to the steam turbine to drive a generator 5. The hot water still remaining in the flashing apparatus 4 is transferred into a return well 6 and the steam used in the steam generator 3 is then condensed in a condenser 7. The condensate is mixed with cooling water and recovered in a cooling tower 9 by the operation of a pump 8.

FIG. 2 schematically shows an internal arrangement of a typical flashing apparatus of the type presently used, in which underground water heated by terrestrial heat introduced into a drum-shaped shell 11 through inlets 12 is ejected thereinto through ejecting nozzles 13. A portion of the ejected hot water is changed into flashed steam in an amount proportional to an enthalpy of the hot water to be ejected and this flashing phenomenon is enhanced by collision of the ejected hot water against guide plates 14 located near the front ends of the respective nozzles 13. The flashed steam rises in the space of the drum shell 11 and is supplied to the steam turbine through outlets 15 provided for the upper portion of the shell 11. The hot water remaining in the shell 11 is collected at the bottom thereof and then drained through a drain outlet 16 into a return pump, not shown.

With the flashing apparatus of the type as described above, after the hot water ejected from the nozzles 13 has collided against the guide plates 14, water drops each having a considerably large diameter among the water drops dispersed in the shell 11 fall by gravity and are collected at the bottom of the shell 1 as drain water. On the other hand, water drops each having a considerably small diameter rise together with flashed steam and are fed into the steam turbine 3 through the steam outlets 15.

The lower the degree of dryness of the steam caused by the mixing of the hot water drops, the higher the degree of wetness of the steam at the final operating stage of the turbine, which may cause corrosion of the nozzles and blades of the turbine. In addition, a large quantity of substances such as silica, calcium, and the like are contained in the drops of underground hot water without being separated in the flashing apparatus, so that such substances are deposited on the surfaces of the nozzles and blades located near the entrance of the turbine. Such deposited substances narrow the passages of the turbine and lower the output thereof, thus adversely affecting its operation.

As described hereinabove, in order to improve the performance and reliability of the geothermal power plant, it is necessary to obtain flashed steam including substantially no water drops of underground hot water.

SUMMARY OF THE INVENTION

An object of this invention is to provide a flashing apparatus of a geothermal power plant in which flashing steam of underground hot water having a high degree of dryness can be fed to a turbine.

According to this invention there is provided a flashing apparatus of the type comprising a horizontal cylindrical container, the container being provided with an underground hot water inlet provided at the central portion of the peripheral wall of the container, a nozzle connected to the hot water inlet to flash the underground hot water into the container, a drain discharge outlet provided at the lower side of the container and a steam discharge outlet provided at the upper side of the container, the flashing apparatus being characterized in that said horizontal cylindrical container is closed at both ends by end plates one of which has a hemi-spherical surface and the nozzle is directed towards the hemispherical surface of the one of end plates, and that the flashing apparatus comprises a drain catcher for catching and removing hot water drain after the hot water has been ejected against the hemi-spherical surface of said one end plate, the drain catcher being located near the one end plate and disposed concentrically with the nozzle, a first partition plate attached to an inner peripheral surface of the container and provided with a plurality of through holes, a second partition plate located horizontally in the container and connected to a lower end of the first partition plate so as to define a flashing chamber between the first partition plate and the one end plate, the drain catcher being positioned in the flashing chamber, the second partition plate having an extension extending horizontally and being provided with a plurality of through holes thereby to define a drain discharge chamber between the extension and a lower peripheral wall of the container, and a third partition plate provided with a plurality of through holes and located near the other one of the end plates so as to define a steam discharge chamber between the third partition plate and the other end plate and also define a chamber for separating and removing water drops contained in flashed steam generated in the flashing chamber between the first and third partition plates and the extension of the second partition plate.

DESCRIPTION OF THE PREFERRED EMBODIMENTS

Figure 1:
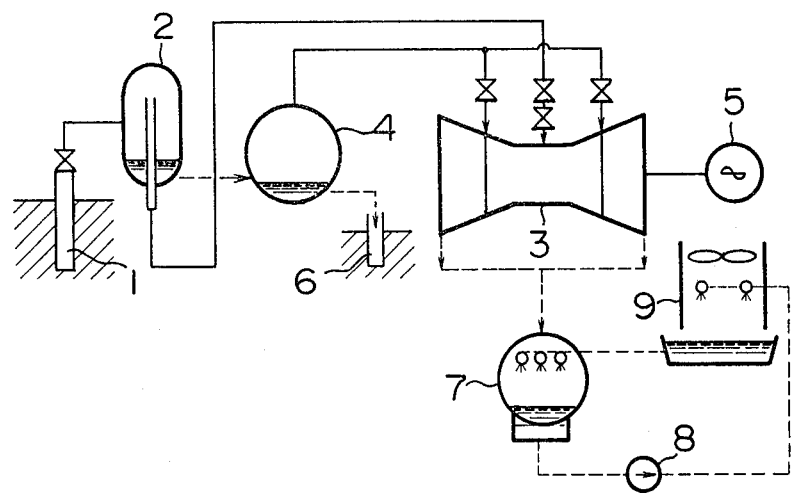
FIG. 1 shows a schematic diagram of a known type geothermal power plant which utilizes underground hot water.
Figure 2:
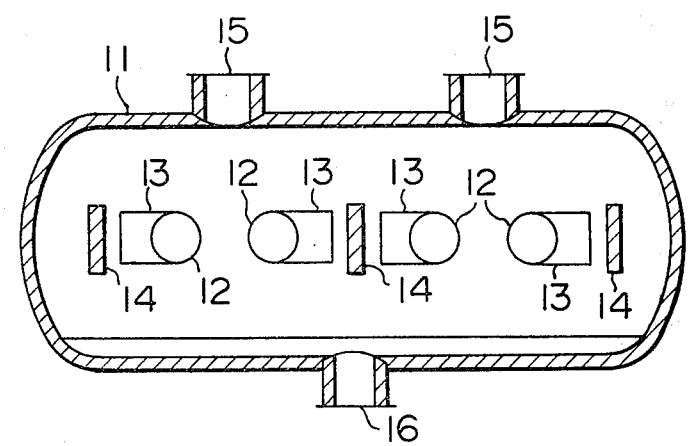
FIG. 2 is a longitudinal section of a flashing apparatus of a geothermal power plant shown in FIG. 1.
Figure 3:
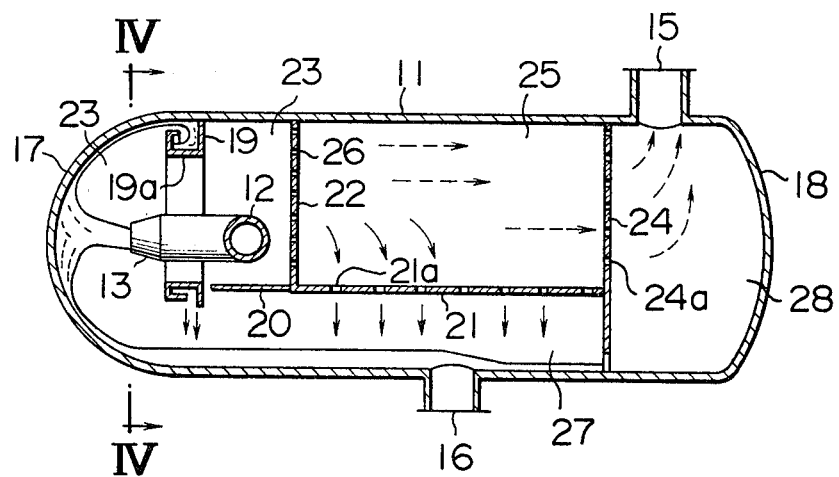
FIG. 3 shows a longitudinal section of a flashing apparatus according to this invention.

FIG. 3 shows a flashing apparatus of a geothermal power plant according to this invention, in which an elongated cylindrical drum shell 11 is provided with a hot steam outlet 15 at its upper side and a drain outlet 16 at its lower side. Outwardly curved, end plates 17 and 18 are provided for both ends of the shell 11 and an inlet 12 for underground hot water is disposed near one curved, preferably hemi-spherical, end plate 17. A nozzle 13 is connected to the front end of the hot water inlet 12 with the central axis of the nozzle 13 coinciding with the central axis of the shell 11. The end plate 17 also acts as a guide plate for the ejected hot water and the hemi-spherical shape of the inner surface of the end plate 17 avoids dispersion of the ejected hot water and facilitates the guidance thereof.

Figure 4:
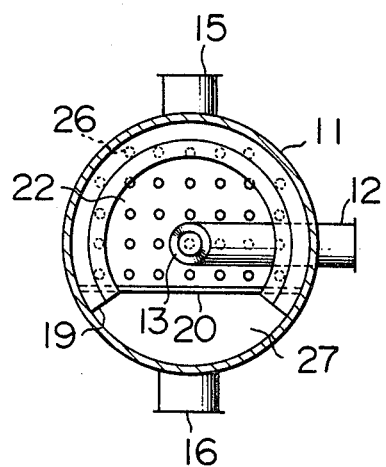
FIG. 4 shows a cross-section of the flashing apparatus taken along the line IV—IV shown in FIG. 3.

A flashing chamber 23 is formed near the end plate 17 and a drain catcher 19 for catching and removing the hot water as drain is located within the flashing chamber 23 and near a portion connecting the cylindrical portion of the shell 11 and the hemi-spherical end plate 17 so as to arrange the drain catcher 19 concentrically with the nozzle 13. The drain catcher 19 has a C-shaped cross-section having a cutout trough 19a, which, as shown in FIG. 4, extends to a level of that of horizontal partition plate 20 at the lower side and the upper side of the drain catcher 19 is connected to the inner peripheral surface of the shell 11. The partition plate 20, preferably made of a steel plate, has an extension in the form of a perforated plate 21 provided with a plurality of holes 21a, and a drain discharge chamber 27 is defined by the plates 20, 21 and the peripheral wall of the shell 11 at the bottom thereof. The partition plate 20 may be slightly inclined leftwardly in FIG. 3.

A chamber 25 for separating hot water drops is formed behind (rightward side as viewed in FIG. 3) the flashing chamber 23 by providing a vertical partition plate 22 across the upper peripheral wall of the shell 11 and the connecting portion of the plates 20 and 21. The partition plate 22 is provided with a plurality of through holes 26. A partition plate 24 provided with through holes 24a is located on the side of the end plate 18 by connecting it to the inner peripheral surface of the shell 11, the partition plate 24 acting as a rectifying plate. A steam exhaust chamber 28 is defined between the rectifying plate 24 and the end plate 18 and the steam outlet 15 is communicated with the chamber 28.

As described hereinabove, the flashing chamber 23, the separation chamber 25, the drain discharge chamber 27, and the steam discharge chamber 28 are defined by the plates 20, 21, 22, and 24, preferably made of steel plates, which are connected with each other or to the inner wall of the shell 11 by known means, for example, welding.

Figure 5:
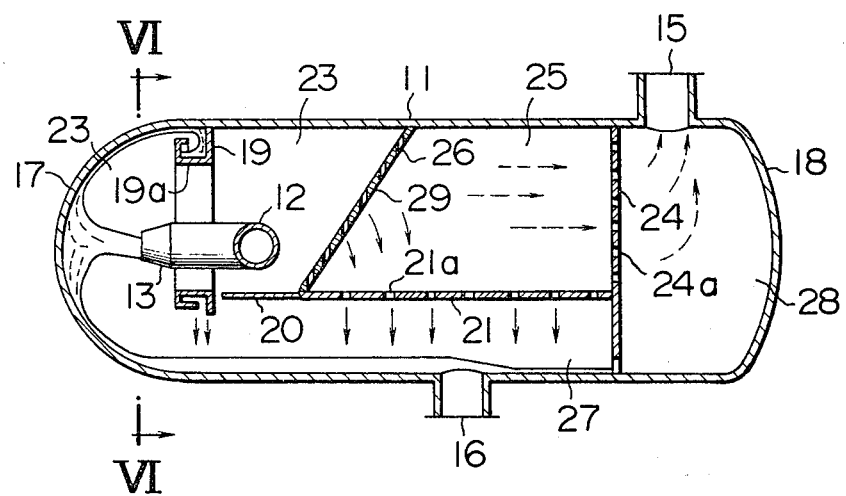
FIG. 5 shows a longitudinal section of another embodiment of the flashing apparatus according to this invention.
Figure 6:
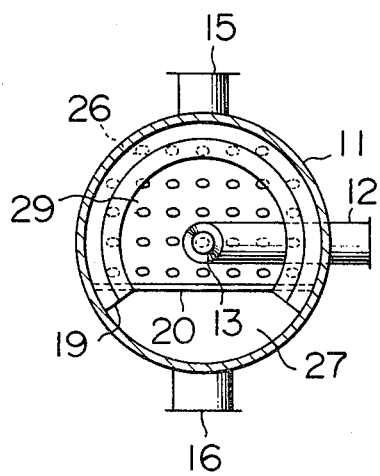
FIG. 6 shows a cross section of the flashing apparatus taken along the line VI—VI shown in FIG. 5.

As shown in FIG. 5, an oblique partition plate 29 provided with a plurality of through holes 26a which are perpendicular to the longitudinal axis of the shell 11 may be used in place of the vertical partition plate 22.

The flashing apparatus of a geothermal power plant according to this invention operates as follows.

The underground hot water introduced into the flushing apparatus through the inlet 12 is ejected into the flashing chamber 23 through the nozzle 13 and flashes to generate hot steam in an amount proportional to the enthalpy of the hot water to be flashed. The ejected hot water then collides with and adheres to the spherical surface of the end plate 17 to thereby form a thin water film thereon, which is then changed into water drops which flow downwardly along the spherical surface into the trough 19a of the drain catcher 19. The drain collected into the drain chamber 27 is discharged outwardly through the drain outlet 16.

Among the water drops dispersed in the flashing chamber 23 together with the flashed steam, water drops each having a large diameter fall by gravity in the flashing chamber 23 and are discharged together with the drain water outwardly through the outlet 16. On the other hand, water drops each having a small diameter move rightwardly as viewed in FIG. 3 together with the flashed steam into the separation chamber 25 through the holes 26 of the partition plate 22. At a time when the water drops pass through the holes 26 the moving speed thereof slows down, so that most of the water drops fall on the perforated plate 21 and are received into the drain chamber 27 through the holes 21a of the plate 21.

The flashed hot steam guided into the separation chamber 25 moves horizontally at a low speed towards the rectifying plate 24. The water drops which have not fallen down when they have passed through the partition plate 22, fall down during the slow speed movement of the steam between the partition plates 22 and 24. In addition, since the partition plates 22 and 24 also act to capture the water drops when the hot steam passes therethrough, almost all the water drops contained in the hot steam stream are captured and removed as drain water until a time at which the steam stream reaches the steam exhaust chamber 28. Thus, the steam having a desired dryness can be fed to the turbine from the chamber 28 through the steam outlet 15.

In a case where the oblique partition plate 29 provided with vertical through holes 26a is used, the steam passing the oblique plate 29 is directed downwardly, thus enhancing the fall of the water drops contained in the steam and the horizontal speed of the steam in the separation chamber 25 is further decreased.

As described hereinabove, according to this invention, the end plate 17 of the shell 11 of the flashing apparatus is formed to be hemi-spherical, so that the hot water ejected into the inner surface forms a thin water film and flows downwardly along the surface without almost being dispersed. Thus, the hot water is guided as a drain into the drain chamber 27 independently of the flow of the flashed steam. Moreover, the water drops contained in the flashed steam stream are almost captured or they fall down during the movement through the partition plates 22 (29) and 24 and in the separation chamber 25, so that steam having a desirable degree of dryness can be obtained when the steam reaches the steam exhaust chamber 28. Thus, the blades and nozzles of a steam turbine do not suffer from corrosion caused by water and harmful substances such as silica and calcium contained therein and a geothermal power plant having high performance and reliablity can be provided.

What is claimed is:

1. A flashing apparatus for a geothermal power plant comprising:
   a horizontal cylindrical container closed at both ends by end plates one of which has a hemi-spherical surface, said container being provided with an underground hot water inlet at a central portion of a peripheral wall of said container;
   a nozzle connected to said hot water inlet and directed towards said hemi-shperical surface of said one end plate;
   means for catching and removing hot water drain after the hot water has been ejected against said hemi-spherical surface of said one end plate, said means being located near said one end plate and disposed concentrically with said nozzle;

a first partition plate attached to an inner peripheral surface of said container and provided with a plurality of through holes;

a second partition plate located horizontally in said container and connected to a lower end of said first partition plate so as to define a flashing chamber between said first partition plate and said one end plate, said drain catching means being positioned in said flashing chamber, said second partition plate having an extension extending horizontally and being provided with a plurality of through holes to thereby define a drain discharge chamber between said extension and a lower peripheral wall of said container;

a drain outlet provided for the lower peripheral wall of said container to remove the drain in said drain discharge chamber;

a third partition plate provided with a plurality of through holes and located near the other one of said end plates so as to define a steam discharge chamber between said third partition plate and said other end plate and also define a chamber for separating and removing water drops contained in flashed steam generated in said flashing chamber between said first and third partition plates and said extension of said second partition plate; and a steam outlet provided for an upper peripheral wall of said container to feed steam in said steam discharge chamber into a steam turbine of the geothermal power plant.

2. The flashing apparatus according to claim 1 wherein said drain catching means comprises a trough having a C-shaped cross section and provided with a cut-out at its lower portion, said trough being located along the peripheral surface of said container and having both ends extending to the same horizontal level as that of said second partition plate.

3. The flashing apparatus according to claim 1 wherein said first partition plate is a vertical plate provided with a plurality of through holes which are parallel with a longitudinal axis of said container.

4. The flashing apparatus according to claim 1 wherein said first partition plate is an oblique plate provided with a plurality of through holes which are perpendicular to the longitudinal axis of said container.

* * * * *